(12) United States Patent
Miyagawa et al.

(10) Patent No.: US 10,823,942 B2
(45) Date of Patent: Nov. 3, 2020

(54) ZOOM LENS AND OPTICAL INSTRUMENT

(71) Applicant: Sony Corporation, Tokyo (JP)

(72) Inventors: Naoki Miyagawa, Kanagawa (JP); Yonghua Chen, Tokyo (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 16/064,807

(22) PCT Filed: Dec. 9, 2016

(86) PCT No.: PCT/JP2016/086674
§ 371 (c)(1),
(2) Date: Jun. 21, 2018

(87) PCT Pub. No.: WO2017/134929
PCT Pub. Date: Aug. 10, 2017

(65) Prior Publication Data
US 2019/0018229 A1 Jan. 17, 2019

(30) Foreign Application Priority Data
Feb. 1, 2016 (JP) ................. 2016-016980

(51) Int. Cl.
*G02B 13/18* (2006.01)
*G02B 15/20* (2006.01)
(Continued)

(52) U.S. Cl.
CPC .............. *G02B 13/18* (2013.01); *G02B 9/62* (2013.01); *G02B 15/173* (2013.01);
(Continued)

(58) Field of Classification Search
CPC .... G02B 15/173; G02B 15/177; G02B 15/14; G02B 13/009; G02B 27/646; G02B 15/00;
(Continued)

(56) References Cited

U.S. PATENT DOCUMENTS

2012/0075716 A1* 3/2012 Kon ...................... G02B 15/173
359/684
2012/0113516 A1* 5/2012 Kimura ................ G02B 27/646
359/557

(Continued)

FOREIGN PATENT DOCUMENTS

JP 11-072705 3/1999
JP 2010-191336 A 9/2010
(Continued)

*Primary Examiner* — William R Alexander
*Assistant Examiner* — Sharrief I Broome
(74) *Attorney, Agent, or Firm* — Michael Best & Friedrich LLP

(57) ABSTRACT

A zoom lens according to the disclosure includes a first lens group having positive refractive power, a second lens group, a third lens group, a fourth lens group, a fifth lens group, and a sixth lens group. The first lens group includes a front side first lens group fixed with respect to an image plane upon zooming from a wide end to a telephoto end and focusing from an infinite object to a short-distance object, and a rear side first lens group having positive refractive power. The second, third, and fifth lens groups travel along an optical axis upon zooming. The fourth and sixth lens groups are fixed with respect to the image plane in an optical axis direction upon zooming. At least two lens groups including the rear side first lens group travel along the optical axis upon focusing.

21 Claims, 7 Drawing Sheets

(51) Int. Cl.
  *G02B 15/173* (2006.01)
  *G02B 9/62* (2006.01)
  *G02B 15/177* (2006.01)
  *G02B 13/00* (2006.01)

(52) U.S. Cl.
  CPC ............ *G02B 15/177* (2013.01); *G02B 15/20* (2013.01); *G02B 13/009* (2013.01)

(58) Field of Classification Search
  CPC ........ G02B 3/14; G02B 3/0081; G02B 7/102; G02B 13/0045; G02B 15/17; G02B 27/0025; G02B 13/18; G02B 26/005; G02B 7/10; G02B 13/04; G02B 13/16; G02B 15/04; G02B 21/22; G02B 27/09; G03B 2205/0046; G03B 17/00; G03B 17/17; G03B 5/00; G03B 13/32; G03B 13/36; G03B 15/00; G03B 17/06; G03B 17/14; G03B 17/54; G03B 19/00; G03B 19/14; G03B 21/005; G03B 21/14; G03B 21/142; G03B 21/28; G03B 2205/0007; G03B 2205/0084; G03B 2217/007; G03B 3/10; H04N 5/2254; H04N 5/23209; H04N 5/23296; H04N 5/2251; H04N 5/232; H04N 5/23212; H04N 5/238; H04N 13/236; H04N 5/225; H04N 5/23241; H04N 5/77; H04N 5/907; H04N 9/3176; H04N 9/7921
  See application file for complete search history.

(56) References Cited

U.S. PATENT DOCUMENTS

2014/0355127 A1* 12/2014 Nagahara ............. G02B 15/177
  359/649
2015/0168697 A1* 6/2015 Ogata .................. G02B 15/173
  359/684

FOREIGN PATENT DOCUMENTS

| JP | 2011-175185 A | 9/2011 |
| JP | 2011-197471 A | 10/2011 |
| JP | 2012-093548 A | 5/2012 |
| JP | 2012-098592 A | 5/2012 |
| JP | 2012-108244 A | 6/2012 |

* cited by examiner

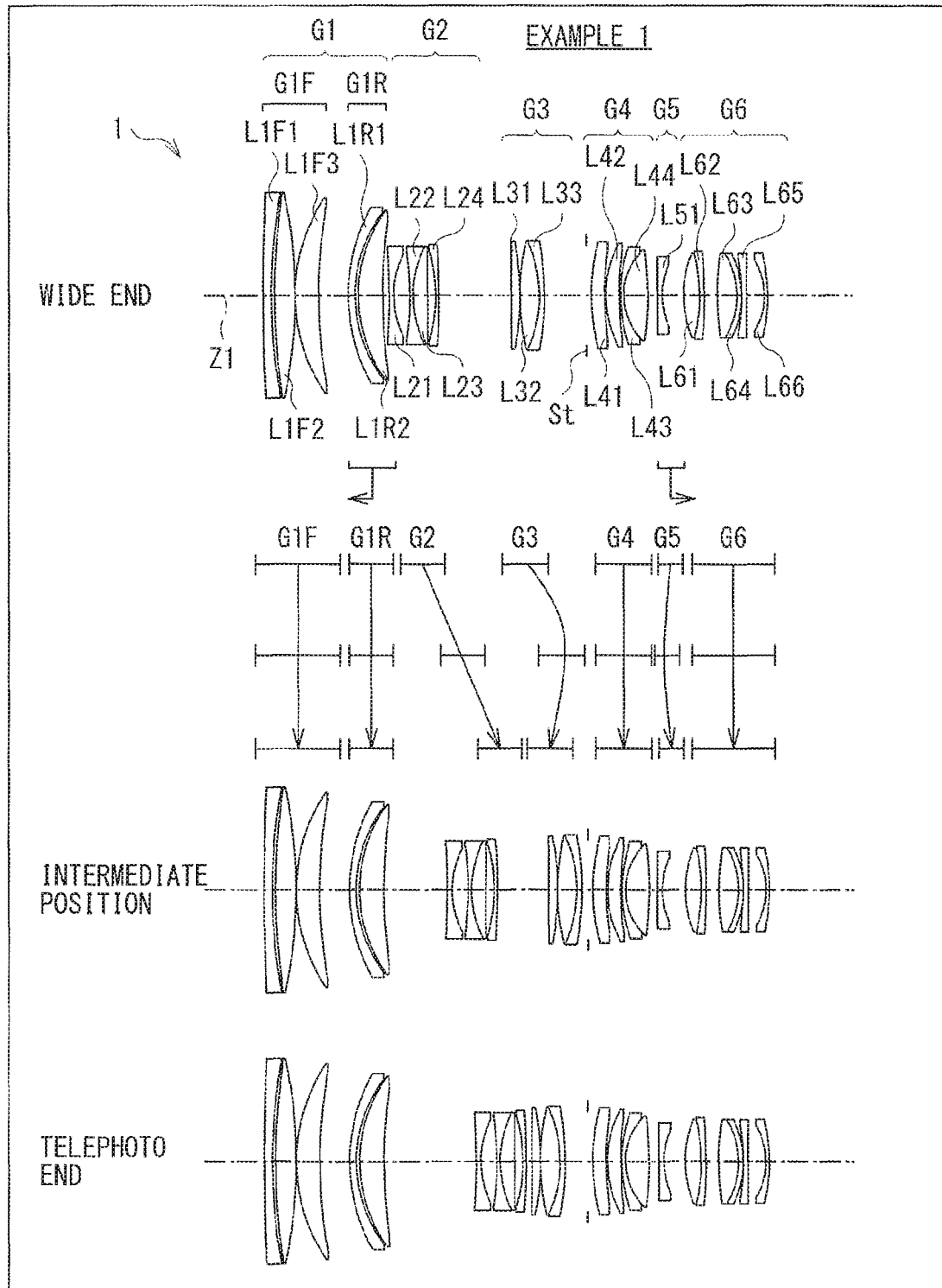
[FIG. 1]

[FIG. 2]
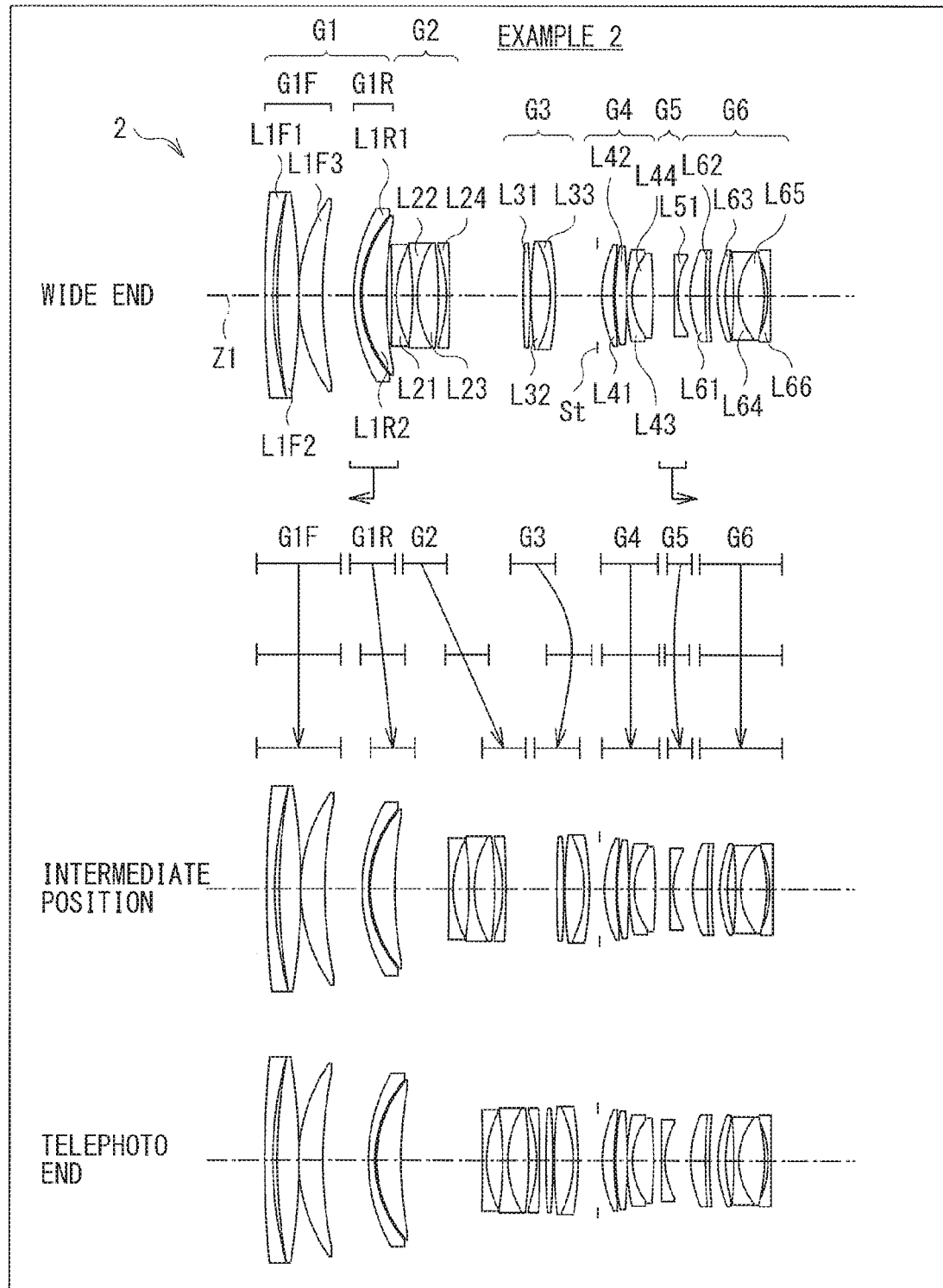

[FIG. 3]
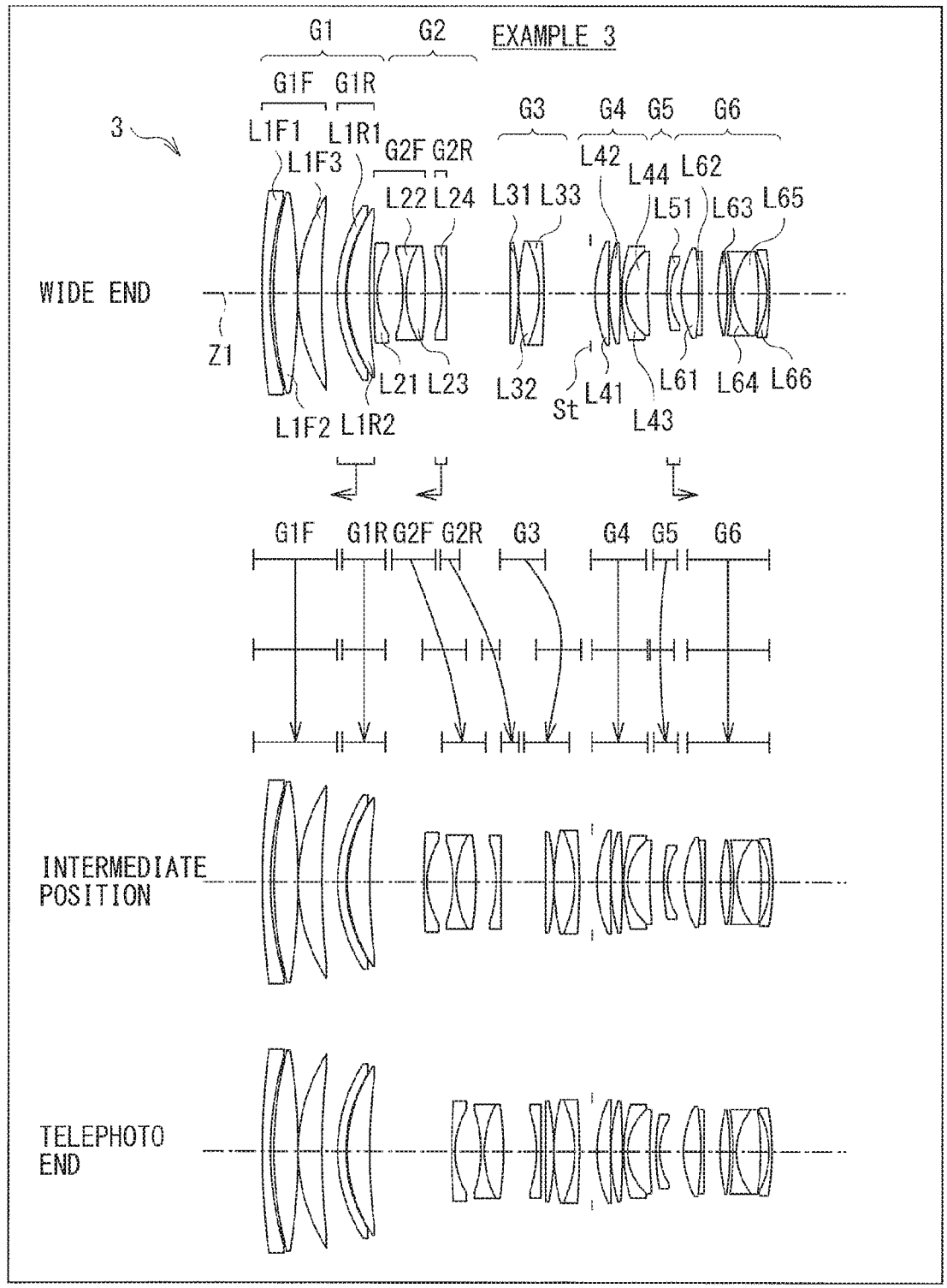

[FIG. 4]
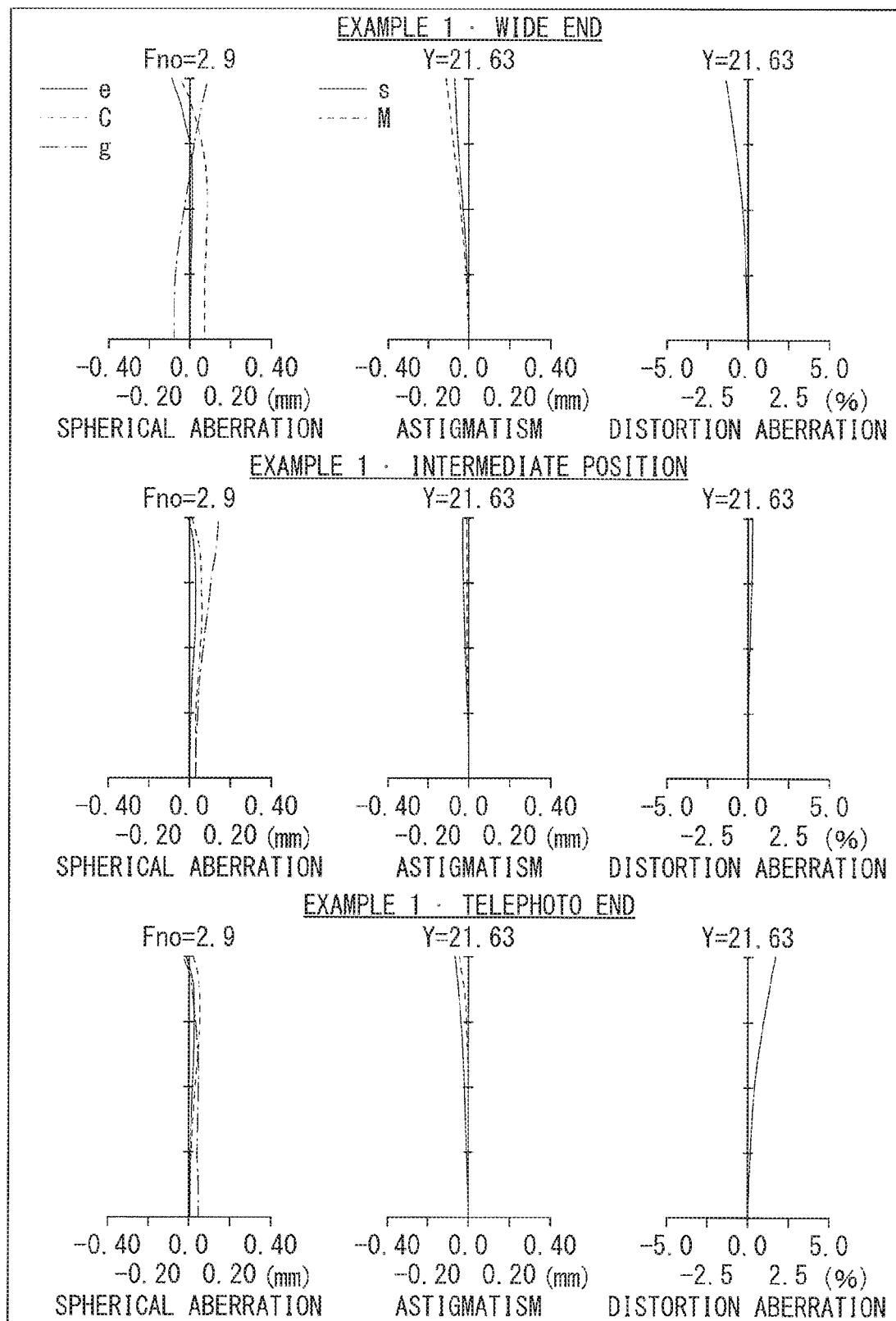

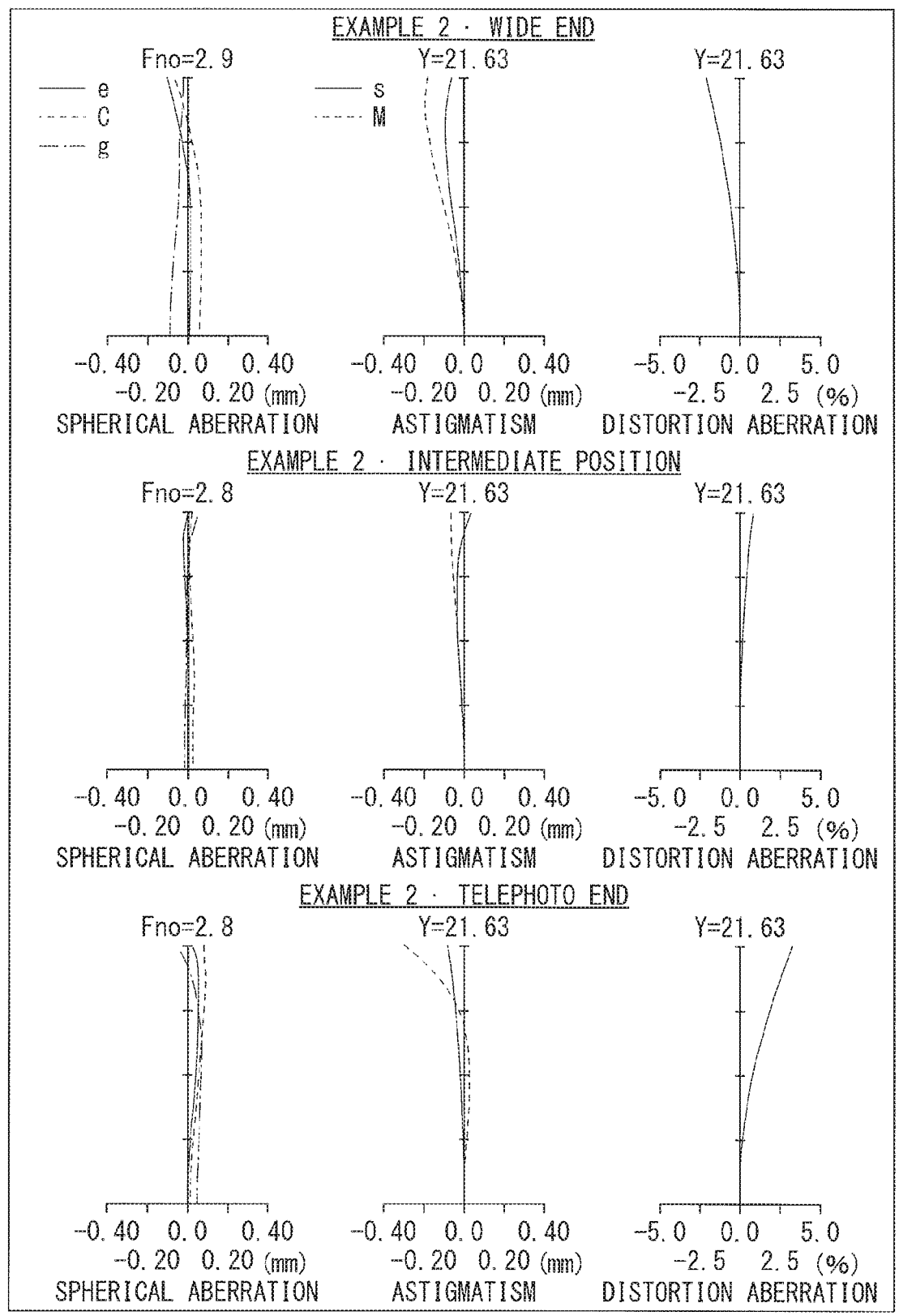
[FIG. 5]

[FIG. 6]
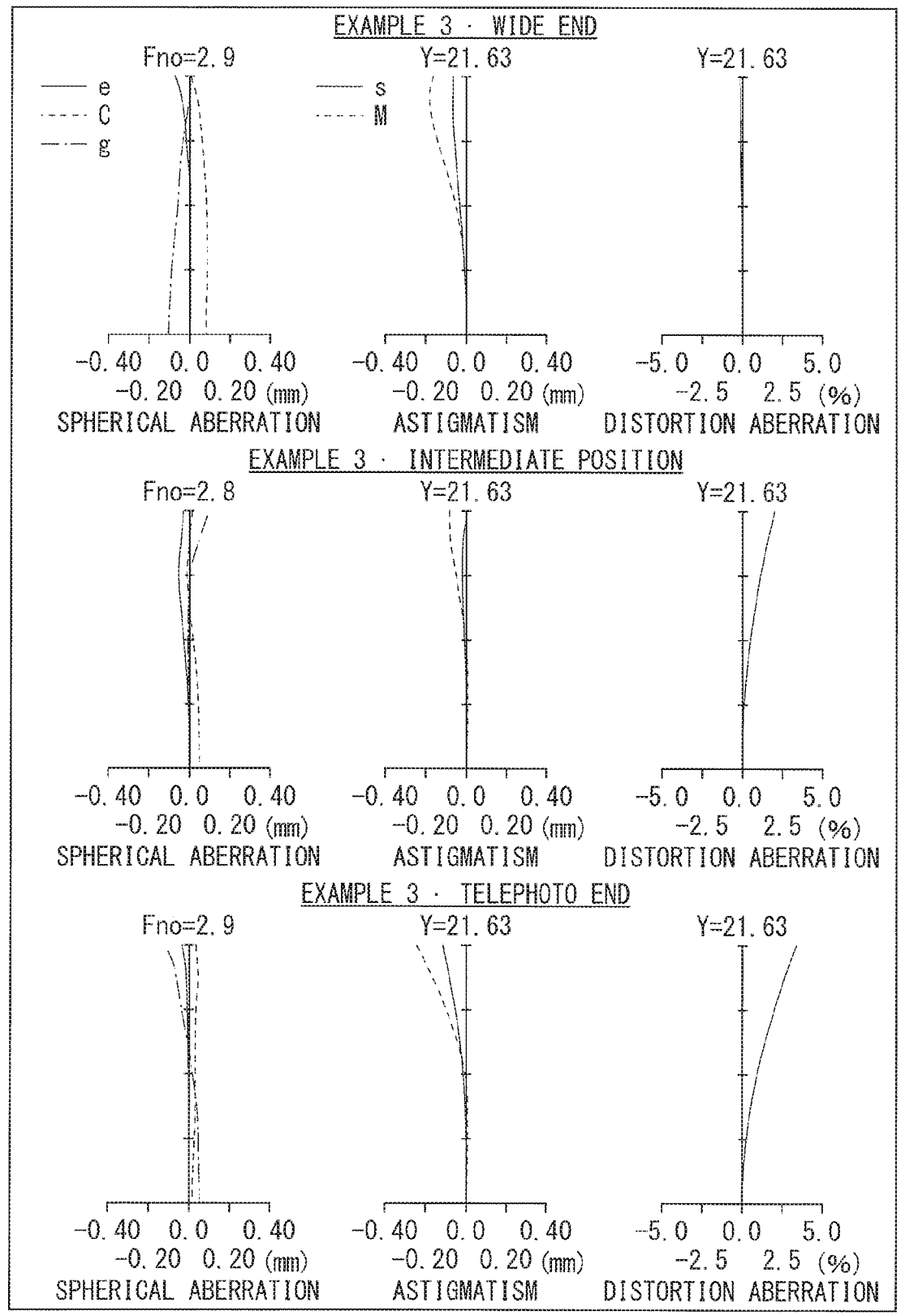

[FIG. 7]
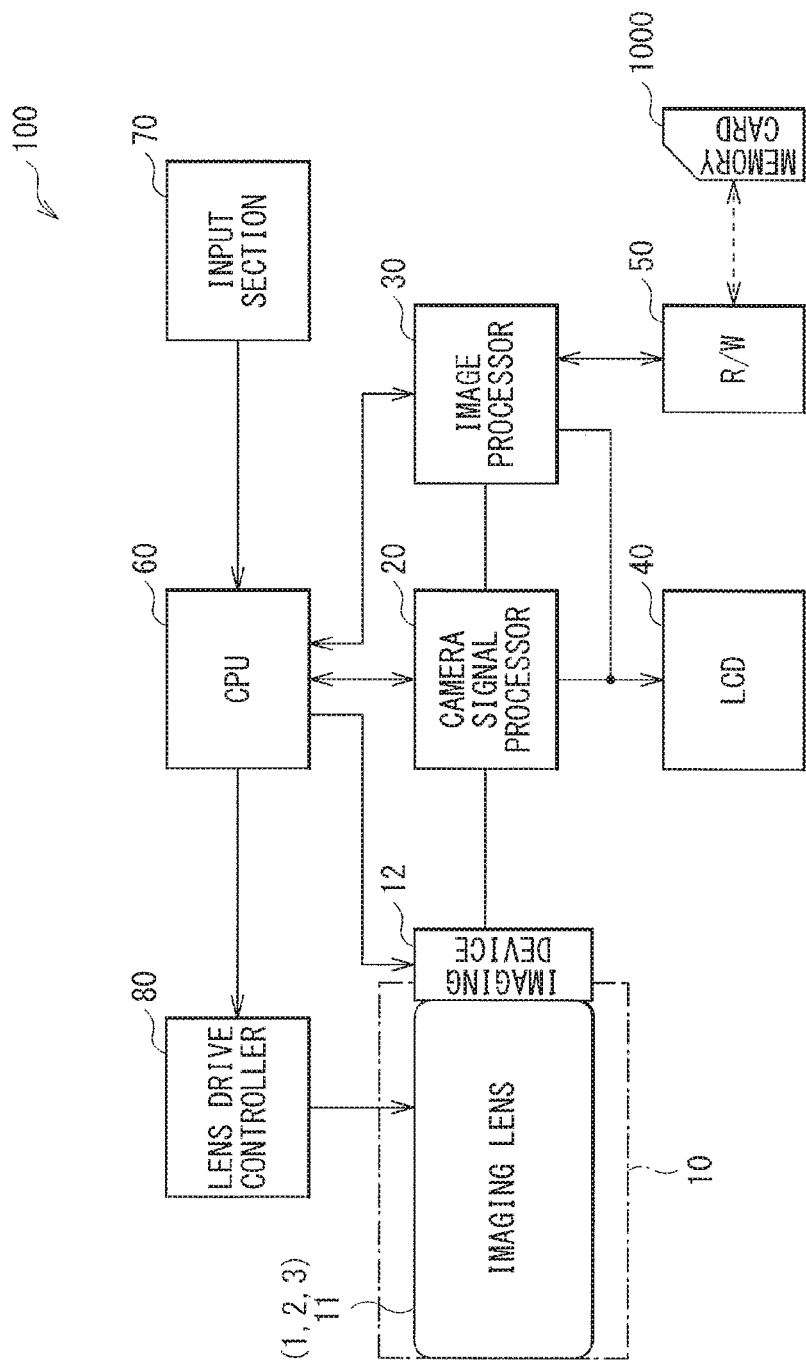

ZOOM LENS AND OPTICAL INSTRUMENT

TECHNICAL FIELD

The disclosure relates to a telephoto zoom lens of an internal focusing system and an optical instrument. More particularly, the disclosure relates to a zoom lens using a focusing system that is suitably used, especially, for a single-lens reflex camera, a non-reflex camera, and a digital still camera, etc. and that is able to perform favorable aberration correction throughout an overall object distance from infinite to a short distance, and to an optical instrument including such a zoom lens.

BACKGROUND ART

For example, PTLs 1 and 2 have proposed a F2.8 class telephoto zoom lens suitable for a photographic camera, a digital still camera, a video camera, and the like.

CITATION LIST

Patent Literature

PTL 1: Japanese Unexamined Patent Application Publication No. 2012-93548
PTL 2: Japanese Unexamined Patent Application Publication No. 2010-191336

SUMMARY OF THE INVENTION

In the zoom lens disclosed in PTL 1, however, a focusing lens group is present only in a first lens group, which necessitates a long focusing stroke, making it difficult to reduce a total length of the zoom lens and making it difficult to have a high-speed focusing. Further, a focusing system in which only one lens group travels has a large aberration variation due to the focusing, making it difficult to achieve a favorable optical performance, in particular, at a shortest distance.

Further, the zoom lens disclosed in PTL 2 has a five-group configuration of positive, negative, positive, negative, and positive in order from object side, in terms of refractive power of each lens group, in which zooming is performed by movement of a second lens group of negative refractive power, a third lens group of positive refractive power, and a fourth lens group of negative refractive power. Focusing is performed by the movement of the third lens group of positive refractive power. However, a long focusing stroke is still necessary, making it difficult to reduce a total length of the zoom lens.

Further, in recent years, there has been a demand, also in an interchangeable-lens digital camera, for a zoom lens system optimized for photographing of not only a still image, but also a moving image. It is necessary, in the photographing of a moving image, to cause a lens group that performs focusing to travel at a high speed in order to follow a quick motion of a subject. Accordingly, it is requested for the focusing lens group to have a small amount of movement and to have a reduced weight.

It is desirable to provide a zoom lens that makes it possible to achieve reduction in total length thereof as well as reduction in size and weight of a focusing lens group while having a high image-forming performance, and an optical instrument mounted with such a zoom lens.

A zoom lens according to an embodiment of the disclosure includes: in order from object side toward image plane side, a first lens group having positive refractive power; a second lens group; a third lens group; a fourth lens group; a fifth lens group; and a sixth lens group. The first lens group includes, in order from the object side toward the image plane side, a front side first lens group fixed with respect to an image plane upon zooming from a wide end to a telephoto end and focusing from an infinite object to a short-distance object, and a rear side first lens group having positive refractive power. The second lens group, the third lens group, and the fifth lens group travel along an optical axis upon the zooming. The fourth lens group and the sixth lens group are fixed with respect to the image plane in an optical axis direction upon the zooming. At least two lens groups including the rear side first lens group travel along the optical axis upon the focusing.

An optical instrument according to an embodiment of the disclosure includes a zoom lens and an imaging device that outputs an imaging signal corresponding to an optical image formed by the zoom lens. The zoom lens is configured by the zoom lens according to an embodiment of the disclosure.

The zoom lens or the optical instrument according to an embodiment of the disclosure has an overall six-group configuration in which the first lens group includes the front side first lens group and the rear side first lens group, and in which the second lens group, the third lens group, and the fifth lens group travel along the optical axis upon the zooming. Further, at least two lens groups including the rear side first lens group travel along the optical axis upon focusing.

The zoom lens or the optical instrument according to an embodiment of the disclosure has an overall six-group configuration in which the first lens group includes the front side first lens group and the rear side first lens group, and in which at least two lens groups including the rear side first lens group travel along the optical axis upon focusing, thus making it possible to achieve reduction in a total length thereof as well as reduction in size and weight of a focusing lens group while having a high image-forming performance.

It is to be noted that the effects described here are not necessarily limitative, and may be any of the effects described in the disclosure.

BRIEF DESCRIPTION OF DRAWINGS

FIG. 1 is a lens cross-sectional view of a first configuration example of a zoom lens according to an embodiment of the disclosure.

FIG. 2 is a lens cross-sectional view of a second configuration example of the zoom lens.

FIG. 3 is a lens cross-sectional view of a third configuration example of the zoom lens.

FIG. 4 is an aberration diagram illustrating various aberrations at each of a wide end, an intermediate position, and a telephoto end in Numerical Example 1 in which specific numerical values are applied to the zoom lens illustrated in FIG. 1.

FIG. 5 is an aberration diagram illustrating various aberrations at each of a wide end, an intermediate position, and a telephoto end in Numerical Example 2 in which specific numerical values are applied to the zoom lens illustrated in FIG. 2.

FIG. 6 is an aberration diagram illustrating various aberrations at each of a wide end, an intermediate position, and a telephoto end in Numerical Example 3 in which specific numerical values are applied to the zoom lens illustrated in FIG. 3.

FIG. 7 is a block diagram illustrating a configuration example of an optical instrument.

MODES FOR CARRYING OUT THE INVENTION

Hereinafter, some embodiments of the disclosure are described in detail with reference to drawings. It is to be noted that the description is given in the following order.
1. Basic Configuration of Lens
2. Workings and Effects
3. Application Example to Optical instrument
4. Numerical Examples of Lens
5. Other Embodiments

1. Basic Configuration of Lens

FIG. 1 illustrates a first configuration example of a zoom lens according to an embodiment of the disclosure. FIG. 2 illustrates a second configuration example of the zoom lens. FIG. 3 illustrates a third configuration example of the zoom lens. Numerical examples in which specific numerical values are applied to these configuration examples are described later. In FIG. 1, etc., Z1 denotes an optical axis. An optical component such as seal glass for protecting an imaging device and various optical filters may be disposed between the zoom lens and an image plane.

Although a configuration of the zoom lens according to the present embodiment is described below to be associated with configuration examples illustrated in FIG. 1, etc. where appropriate, techniques according to the disclosure are not limited to the illustrated configuration examples.

The zoom lens according to the present embodiment substantially includes six lens groups in which a first lens group G1 having positive refractive power, a second lens group G2 having negative refractive power, a third lens group G3 having positive refractive power, a fourth lens group G4 having positive refractive power, a fifth lens group G5 having negative refractive power, and a sixth lens group G6 having positive refractive power are disposed in order along the optical axis Z1 from object side toward image plane side.

The first lens group G1 includes, in order from the object side toward the image plane side, a first F lens group (a front side first lens group) G1F having positive refractive power and a first R lens group (a rear side first lens group) G1R having positive refractive power.

Here, FIGS. 1 to 3 each illustrate disposition of each of lens groups at a wide end (a short focal length end), an intermediate position (a standard angle of view, an intermediate focal length), and a telephoto end (a long focal length end). Further, FIGS. 1 to 3 each illustrate a locus of movement of each of the lens groups upon zooming from a wide end to a telephoto end.

The zoom lens according to the present embodiment has a configuration in which at least the second lens group G2 the third lens group G3, and the fifth lens group G5 travel along an optical axis upon zooming from the wide end to the telephoto end. The fourth lens group G4 and the sixth lens group G6 are fixed with respect to the image plane in an optical axis direction upon zooming.

Further, the zoom lens according to the present embodiment has a configuration in which at least two lens groups including the rear side first lens group G1R travel along the optical axis upon focusing from an infinite object to a short-distance object.

Further, in the zoom lens according to the present embodiment, the front side first lens group G1F is fixed with respect to the image plane upon zooming and focusing.

Aside from the foregoing, the zoom lens according to the present embodiment desirably satisfies a predetermined conditional expression, etc, described later.

2. Workings and Effects

Description is given next of workings and effects of the zoom lens according to the present embodiment. In addition, description is given of desirable configurations of the zoom lens according to the present embodiment.

It is to be noted that effects described herein are merely illustrative and are not limitative, and may also have other effects.

The zoom lens according to the present embodiment has an overall six-group configuration in which the first lens group G1 includes the front side first lens group G1F and the rear side first lens group G1R, and in which at least two lens groups including the rear side first lens group G1R travel along the optical axis upon focusing, thus making it possible to achieve reduction in a total length thereof as well as reduction in size and weight of a focusing lens group while having a high image-forming performance. In particular, short-focusing stroke and high-speed focus becomes possible. This makes it possible to provide a telephoto zoom lens having a reduced total length and having high optical performance throughout an entire region of an object distance, and an optical instrument using the telephoto zoom lens.

In the zoom lens according to the present embodiment, upon zooming from the wide end to the telephoto end, the front side first lens group G1F, the fourth lens group G4, and the sixth lens group G6 are fixed with respect to the image plane in the optical axis direction, and at least the second lens group G2, the third lens group G3, and the fifth lens group G5 travel in the optical axis direction. In the zoom lens according to the present embodiment, the fourth lens group G4, the fifth lens group G5, and the sixth lens group G6 configure the principal image-forming system in the zoom lens. Accordingly, moving the fifth lens group G5 during zooming makes it possible to vary a focal length of the principal image-forming system. As a result, it is possible to achieve a zoom lens having a reduced total optical length.

The rear side first lens group G1R is desirably fixed with respect to the image plane in the optical axis direction upon zooming. It is to be noted that a zoom lens 1 of the first configuration example of FIG. 1 and a zoom lens 3 of the third configuration example of FIG. 3 satisfy this configuration. However, as in a zoom lens 2 of the second configuration example of FIG. 2, for example, it is also possible to cause the rear side first lens group G1R to travel along the optical axis upon zooming.

The zoom lens according to the present embodiment is a zoom lens of a so-called floating focus system in which at least two lens groups including the rear side first lens group G1R travel as focusing lens groups upon focusing from the infinite object to the short-distance object. Performing the focusing from the infinite object to the short-distance object by moving the at least two lens groups including the rear side first lens group G1R makes it possible to reduce a stroke of each of the focusing lens groups. This not only allows for high-speed focusing, but also makes it possible to effectively perform correction of various aberrations at the time of short-distance photographing.

The zoom lens according to the present embodiment desirably satisfies the following conditional expression (1):

$$0.4 < F1R/F1 < 0.56 \tag{1}$$

provided that

F1 denotes a focal length of the first lens group G1, and

F1R denotes a focal length of the rear side first lens group G1R.

The conditional expression (1) specifies a ratio between the focal length of the first lens group G1 and the focal length of the rear side first lens group G1R, within a proper range. Satisfying the conditional expression (1) makes it possible to properly specify a focusing stroke of the rear side first lens group G1R. When exceeding an upper limit of the conditional expression (1), refractive power of the rear side first lens group G1R becomes too weak, causing the focusing stroke to be increased, making it difficult to shorten the total optical length of the zoom lens. Meanwhile when falling below a lower limit of the conditional expression (1), an amount of generation of an aberration due to the rear side first lens group G1R becomes too large, making it difficult to suppress generation of mainly spherical aberration and coma aberration at the time of focusing.

It is to be noted that, in order to achieve the effect of the above-described conditional expression (1) more favorably, it is more desirable to set the numerical range of the conditional expression (1) as in the following conditional expression (1)'.

$$0.42 < F1R/F1 < 0.53 \tag{1}'$$

Further, the zoom lens according to the present embodiment desirably satisfies the following conditional expression (2):

$$0.5 < OL4/F456T < 1.0 \tag{2}$$

provided that

OL4 denotes a distance on an optical axis from an apex of a lens surface, of the fourth lens group G4, positioned closest to the object side to the image plane, and F456T denotes a composite focal length of the fourth lens group G4, the fifth lens group G5, and the sixth lens group G6 at telephoto ends.

The conditional expression (2) specifies a distance on the optical axis from a surface apex of the lens surface, of the fourth lens group G4, positioned closest to the object side to the image plane, within a proper range. Satisfying the conditional expression (2) makes it possible to properly correct various aberrations generated at the fourth lens group G4 while keeping a distance from the fourth lens group G4 to the image plane short. When exceeding an upper limit of the conditional expression (2), the distance from the fourth lens group G4 to the image plane becomes too long as compared with a focal length of the fourth lens group G4 at a telephoto end, making it difficult to shorten the total optical length of the zoom lens. When falling below a lower limit of the conditional expression (2), the distance from the fourth lens group G4 to the image plane becomes too short, making it difficult to correct mainly spherical aberration, coma aberration, and field curvature.

It is to be noted that, in order to achieve the effect of the above-described conditional expression (2) more favorably, it is more desirable to set the numerical range of the conditional expression (2) as in the following conditional expression (2)'.

$$0.55 < OL4/F456 < 1.0 \tag{2}'$$

Moreover, in the zoom lens according to the present embodiment, it is desirable for further the fifth lens group G5, in addition to the rear side first lens group G1R, to travel along the optical axis upon focusing, in this case, it is desirable to satisfy the following conditional expression (3):

$$-5.5 < (1-\beta t5^2)*\beta t6^2 < -2 \tag{3}$$

provided that

βt5 denotes a lateral magnification of the fifth lens group G5 at a telephoto end at a time of infinite focusing, and βt6 denotes a lateral magnification of the sixth lens group G6 at a telephoto end at a time of infinite focusing. It is to be noted that "*" denotes a symbol of multiplication.

The conditional expression (3) specifies focus sensitivity in a case where the fifth lens group G5 is set as the focusing lens group, within a proper range. Satisfying the conditional expression (3) makes it possible not only to shorten a total length of an optical system, but also to properly correct various aberrations throughout an entire region of object distance. When exceeding an upper limit of the conditional expression (3), refractive power in the case where the fifth lens group G5 is set as the focusing lens group becomes too strong, making it difficult not only to correct various aberrations due to focusing, but also to perform control on accuracy of a stop position of focusing. When falling below a lower limit of the conditional expression (3), a stroke in the case where the fifth lens group G5 is set as the focusing lens group becomes too long, making it difficult to shorten the total optical length.

It is to be noted that, in order to achieve the effect of the above-described conditional expression (3) more favorably, it is more desirable to set the numerical range of the conditional expression (3) as in the following conditional expression (3)'.

$$-5 < (1-\beta t5^2)*\beta t6^2 < -2.3 \tag{3}'$$

Further, in the zoom lens according to the present embodiment, the second lens group G2 may include a negative lens positioned closest to the image plane side. In this case, as in the zoom lens 3 of the third configuration example of FIG. 3, for example, further the negative lens, of the second lens group G2, positioned closest to the image plane side, in addition to the rear side first lens group G1R and the fifth lens group G5, may travel as a third focusing lens group along the optical axis upon focusing.

By setting, as the third focusing lens group, the negative lens, of the second lens group G2, positioned closest to the image plane side, it becomes possible not only to shorten the total optical length and correct various aberrations due to focusing, but also to effectively suppress so-called breathing, i.e., variation in an angle of view that occurs due to the focusing.

Further, the zoom lens according to the present embodiment desirably satisfies the following conditional expression (4):

$$-1.2 < Hft/Ft < -0.5 \tag{4}$$

provided that

Hft denotes a distance from a lens surface positioned closest to the object side to a position of a front side principal point at a time of focusing on infinite at the telephoto end, and Ft denotes a focal length of an entire lens system at the telephoto end.

The conditional expression (4) specifies the position of the front side principal point of the entire optical system, within a proper range. Satisfying the conditional expression (4) makes it possible not only to shorten the total length of the zoom lens but also to crease a maximum photographing magnification at the shortest distance. When exceeding an upper limit of the conditional expression (4), a telephoto ratio of the principal image-forming system of the zoom lens configured mainly by the fourth lens group G4 or a lens group thereafter becomes too long, thus making it difficult to correct mainly spherical aberration, coma aberration, and field curvature. Meanwhile when falling below a lower limit of the conditional expression (4), it becomes difficult to shorten the total length of the zoom lens.

It is to be noted that, in order to achieve the effect of the above-described conditional expression (4) more favorably, it is more desirable to set the numerical range of the conditional expression (4) as in the following conditional expression (4)'.

$$-1.1 < Hft/ft < -0.6 \quad (4)'$$

Moreover, in the zoom lens according to the present embodiment, it is desirable for the front side first lens group G1F to include two positive lenses. In this case, it is desirable to satisfy the following conditional expression (5):

$$80 < vd1F < 110 \quad (5)$$

provided that vd1F denotes a maximum value of Abbe number of each of the two positive lenses of the front side first lens group G1F.

The conditional expression (5) specifies a range of the maximum value of Abbe number of each of the two positive lenses included in the front side first lens group G1F. Using a material of low dispersion that exceeds a lower limit of the conditional expression (5) makes it possible to effectively correct chromatic aberration that occurs at the telephoto end.

Further, in the zoom lens according to the present embodiment, the fourth lens group G4 desirably includes, in order from the object side toward the image plane side, two positive lenses and a cemented lens that includes a negative lens and a positive lens.

Allowing the fourth lens group G4 that forms a principal image-forming group of the zoom lens to have the above-described configuration makes it possible to favorably correct mainly spherical aberration, coma aberration, and field curvature.

Further, in the zoom lens according to the present embodiment, the fifth lens group G5 is desirably configured by one negative lens. In this case, it is desirable to satisfy the following conditional expression (6):

$$1.45 < nd5 < 1.65 \quad (6)$$

provided that nd5 denotes a refractive index of the negative lens that configures the fifth lens group G5.

The conditional expression (6) specifies the refractive index of the negative lens that configures the fifth lens group G5, within a proper range. Satisfying the conditional expression (6) makes it possible to achieve reduction in weight of the focusing lens group in the case where the fifth lens group G5 is set as the focusing lens group, allowing for high-speed focusing.

Further, in the zoom lens according to the present embodiment, it is desirable that one focusing lens group among at least two focusing lens groups have a position detecting sensor that detects a position upon focusing and that other focusing lens group travel along the optical axis on the basis of positional information of the position detecting sensor. For example, it is desirable for the rear side first lens group G1R to include the position detecting sensor. One reason for this is that a focusing position of the rear side first lens group G1R is intended not to be influenced at the time of a so-called wobbling operation of the fifth lens group G5 by allowing the fifth lens group G5 to depend on the rear side first lens group G1R owing to its possible wobbling operation. In the wobbling operation, a lens group having reduced size and weight such as the fifth lens group G5 is constantly driven finely back and forth around a focusing position in order to follow a quick motion of a subject in photographing of a moving image, for example.

Further, in the zoom lens according to the present embodiment, it is possible to shift an image position by shifting, as a vibration-proof lens group, one lens group among lens groups that configure a lens system or a portion of a lens component in one lens group, in a direction substantially perpendicular to the optical axis. In particular, a lens component, of the sixth lens group G6, closest to the object side is preferable because of less aberration variation upon being shifted in the direction substantially perpendicular to the optical axis.

3. Application Example to Optical Instrument

Description is given of an example of application of the zoom lens according to the present embodiment to an optical instrument. In the following, description is given of a configuration example of an imaging unit as an example of the optical instrument.

FIG. 7 illustrates a configuration example of an imaging unit 100 to which the zoom lens according to the present embodiment is applied. The imaging unit 100 is, for example, a digital still camera, and includes a camera block 10, a camera signal processor 20, an image processor 30, a liquid crystal display (LCD) 40, a reader/writer (R/W) 50, a central processing unit (CPU) 60, an input section 70, and a lens drive controller 80.

The camera block 10 serves an imaging function, and includes an optical system that includes an imaging lens 11, and an imaging device 12 such as charge coupled devices (CCD) and complementary metal oxide semiconductor (CMOS). The imaging device 12 converts an optical image formed by the imaging lens 11 into an electric signal to thereby output an imaging signal (image signal) corresponding to the optical image. The zoom lenses 1 to 3 of respective configuration examples illustrated in FIGS. 1, 2, and 3 are applicable as the imaging lens 11.

The camera signal processor 20 performs, on an image signal outputted from the imaging device 12, various signal processings such as analog-digital conversion, noise removal, image quality correction, and conversion to a luminance/color-difference signal, The image processor 30 performs processings of recording and reproduction of an image signal, and performs processings of compression coding/expansion decoding of an image signal on the basis of a predetermined image data format, conversion processing of data specification such as resolution, and the like.

The LCD 40 has a function of displaying various data such as a state of operation of the input section 70 by a user and a photographed image. The R/W 50 writes image data encoded by the image processor 30 into a memory card 1000, and reads the image data recorded in the memory card 1000. The memory card 1000 is, for example, a semiconductor memory detachable from a slot coupled to the R/W 50.

The CPU 60 functions as a control processor that controls each of circuit blocks provided in the imaging unit 100, and controls each of the circuit blocks on the basis of an instruction input signal, etc. from the input section 70. The input section 70 includes various switches, etc. by which predetermined operations are performed by a user. The input section 70 includes, for example, a shutter release button used to perform shutter operations, a selection switch used to select operation modes, and the like, and outputs to the CPU 60 an instruction input signal corresponding to a user's operation. The lens drive controller 80 controls driving of lenses disposed in the camera block 10, and controls an unillustrated motor, etc. that drives each of lenses of the imaging lens 11 on the basis of a control signal from the CPU 60.

The imaging unit 100 includes a shake detector that detects a shake of the unit in association with handshake, although illustration is omitted.

In the following, description is given of operations in the imaging unit 100.

In a photographing standby state, a signal of an image photographed in the camera block 10 is outputted to the LCD 40 via the camera signal processor 20, and is displayed as a camera-through image, under control of the CPU 60. Further, for example, when an instruction input signal for zooming and focusing from the input section 70 is inputted, the CPU 60 outputs a control signal to the lens drive controller 80, and a predetermined lens of the imaging lens 11 travels on the basis of control of the lens drive controller 80.

When an unillustrated shutter of the camera block 10 is operated by the instruction input signal from the input section 70, the signal of the photographed image is outputted from the camera signal processor 20 to the image processor 30, and is subjected to a compression coding processing to be converted into digital data of a predetermined data format. The converted data are outputted to the R/W 50, and written into the memory card 1000.

It is to be noted that, the focusing is performed by the lens drive controller 80 that causes a predetermined lens of the imaging lens 11 to travel on the basis of the control signal from the CPU 60, for example, in a case where the shutter release button of the input section 70 is pressed halfway, in a case where the shutter release button of the input section 70 is pressed fully for recording (photographing), or in other cases.

In a case where the image data recorded in the memory card 1000 are reproduced, in accordance with an operation on the input section 70, predetermined image data are read from the memory card 1000 by the R/W 50, and are subjected to an expansion decoding processing by the image processor 30. Thereafter, a reproduction image signal is outputted to the LCD 40 to cause a reproduced image to be displayed.

Further, the CPU 60 operates the lens drive controller 80 on the basis of a signal outputted from the shake detector that is not illustrated, and causes the vibration-proof lens group to travel in the direction substantially perpendicular to the optical axis Z1 depending on a shake amount.

It is to be noted that, although the above-described embodiment illustrates the example in which the optical instrument is applied to the imaging unit such as the digital still camera, an application range of the optical instrument is not limited to the digital still camera, and the optical instrument is applicable to other various optical instruments. For example, the optical instrument is applicable to a digital single-lens reflex camera, a digital non-reflex camera, a digital video camera, a monitoring camera, and the like. Further, the optical instrument is applicable widely to a camera section, etc. of a digital input/output units such as a mobile phone mounted with a camera and an information terminal mounted with a camera. Further, the optical instrument is also applicable to an interchangeable-lens camera.

EXAMPLES

4. Numerical Examples of Lens

Next, description is given of specific numerical examples of the zoom lens according to the present embodiment. Here, description is given of numerical examples in which specific numerical values are applied to the zoom lenses 1 to 3 of respective configuration examples illustrated in FIGS. 1, 2, and 3.

It is to be noted that meanings, etc. of respective symbols indicated in the following tables and descriptions are as described below, "si" denotes number of i-th surface that is counted from the object side toward the image plane side. "ri" denotes a value (mm) of a paraxial radius of curvature of the i-th surface. "di" denotes a value (mm) of an interval on the optical axis between the i-th surface and (i+1)th surface. "ni" denotes a value of refractive index in d-line (wavelength 587.6 nm) of a material of an optical component having the i-th surface. "vi" denotes a value of Abbe number in the d-line of the material of the optical component having the i-th surface. A portion in which the value of "ri" falls under "∞" denotes a flat surface or an aperture plane (an aperture stop St). A surface marked as "ASP" denotes an aspherical surface. A surface marked as "STO" denotes the aperture stop St. "BF" denotes back focus. "f" denotes a focal length of an entire lens system. "FNo." denotes a F number. "ω" denotes a half angle of view.

In each of numerical examples, an aspherical shape is defined by the following expression of an aspherical surface. It is to be noted that, in each of tables that indicate aspherical coefficients described later, a number of powers of 10 is represented using E. For example, "$1.2 \times 10^{02}$" is represented as "1.2E−02".

(Expression of Aspherical Surface)

$$x = c^2 y^2 / [1 + \{1-(1+K)c^2 y^2\}^{1/2}] + \Sigma A i \cdot y^i$$

Here, x denotes a distance in an optical axis direction from an apex of a lens surface;

y denotes height in a direction perpendicular to an optical axis;

c denotes paraxial curvature at an apex of a lens inverse number of a paraxial radius of curvature);

k denotes Conic constant; and

Ai denotes an i-th order aspherical coefficient.

(Configuration Common to Respective Numerical Examples)

The zoom lenses 1 to 3 to which the following respective numerical examples are applied each have a configuration that satisfies the above-described basic configuration of the lens. That is, the zoom lenses 1 to 3 each include substantially six lens groups in which the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power are disposed in order along the optical axis Z1 from the object side toward the image plane side.

The first lens group G1 includes, in order from the object side toward the image plane side, the first F lens group (the front side first lens group) G1F having positive refractive power and the first R lens group (the rear side first lens group) G1R having positive retractive power.

Upon zooming from the wide end toward the telephoto end, the front side first lens group G1F, the fourth lens group G4, and the sixth lens group GE are fixed with respect to the image plane in the optical axis direction, and at least the second lens group G2, the third lens group G3, and the fifth lens group G5 travel in the optical axis direction.

Upon focusing from the infinite object to the short-distance object, at least two lens groups including the rear side first lens group G1R travel as focusing lens groups.

The aperture stop St is disposed between the third lens group G3 and the fourth lens group G4.

Numerical Example 1

Table 1 indicates basic lens data of Numerical Example 1 in which specific numerical values are applied to the zoom lens 1 illustrated in FIG. 1. Further, Table 2 indicates coefficient values in aspherical surfaces. Furthermore, Table 3 indicates values of a focal length f of an entire lens system, F number (FNo.), the half angle of view ω, and a lens total length at each of the wide end (the short focal length end), the intermediate position (the standard angle of view, the intermediate focal length), and the telephoto end (the long focal length end).

Moreover, Table 3 also indicates values of variable surface intervals. In Numerical Example 1, values of surface intervals d10, d17, d22, d30, and d32 vary upon zooming.

In the zoom lens 1 according to Numerical Example 1, the rear side first lens group G1R and the fifth lens group G5 each serve as a focusing lens group. The rear side first lens group G1R travels toward the object side along the optical axis upon focusing from the infinite object to the short-distance object. The fifth lens group G5 travels toward the image plane side along the optical axis upon focusing from the infinite object to the short-distance object.

In the zoom lens 1 according to Numerical Example 1, the front side first lens group G1F includes, in order from the object side, a negative meniscus lens L1F1, a positive lens L1F2, and a positive meniscus lens L1F3. The positive lens L1F2 and the positive meniscus lens L1F3 each include a material with an Abbe number of 95.1, and each have a configuration in which chromatic aberration is favorably corrected at the telephoto end in particular.

The rear side first lens group G1R is fixed with respect to the image plane in the optical axis direction upon zooming. The rear side first lens group G1R includes, in order from the object side, a negative meniscus lens L1R1 and a positive meniscus lens L1R2. Allowing the rear side first lens group G1R to have a configuration of Numerical Example 1 makes it possible to suppress variation in chromatic aberration at the time of focusing.

The second lens group G2 includes, in order from the object side, a negative lens L21, a cemented lens in which a negative lens L22 and a positive lens L23 are joined, and a negative meniscus lens L24. Allowing the second lens group G2 to have the configuration of Numerical Example 1 makes it possible to suppress variation in aberration mainly at the time of zooming.

The third lens group G3 includes, in order from the object side, a positive lens L31, and a cemented lens in which a positive lens L32 and a negative lens L33 are joined. Allowing the third lens group G3 to have the configuration of Numerical Example 1 makes it possible to suppress variation in aberration mainly at the time of zooming.

The fourth lens group G4 having positive refractive power, the fifth lens group G5 having negative refractive power, and the sixth lens group G6 having positive refractive power configure the principal image-forming system of the zoom lens. Moving the fifth lens group G5 at the time of zooming makes it possible to shorten the total length of the zoom lens.

The fourth lens group G4 includes, in order from the object side, a positive lens L41 having an aspherical surface formed on a surface on the object side, a positive lens L42, and a cemented lens in which a negative lens L43 and a positive lens L44 are joined. Allowing the fourth lens group G4 to have the configuration of Numerical Example 1 makes it possible to correct spherical aberration, coma aberration, and field curvature that occur at the fourth lens group G4, the fifth lens group G5, and the sixth lens group G6 that configure the principal image-forming system.

The fifth lens group G5 includes, in order from the object side, a negative lens L51 having an aspherical surface formed on both surfaces thereof. Allowing the fifth lens group G5 to have the configuration of Numerical Example 1 makes it possible to achieve a focusing lens group having a reduced weight.

The sixth lens group G6 includes, in order from the object side, a cemented lens in which a positive lens L61 having an aspherical surface formed on a surface on the object side and a negative lens L62 are joined, a cemented lens in which a positive lens L63 and a negative lens L64 are joined, a negative lens L65, and a negative lens L66. Allowing the sixth lens group G6 to have the configuration of Numerical Example 1 makes it possible to cause an exit pupil position to come close to image side, allowing for an advantageous configuration in avoiding interference between a mount diameter and a ray in a case of using an interchangeable-lens camera.

It is possible for the cemented lens including the positive lens L61 and the negative lens L62 to correct image shake by traveling in a direction perpendicular to the optical axis Z1, as a vibration-proof lens group.

TABLE 1

| Example 1 | | | | | |
| --- | --- | --- | --- | --- | --- |
| Lens Group | si | ri | di | ni | vi |
| G1 | 1 | 580.0000 | 2.8000 | 1.8042 | 46.5025 |
|  | 2 | 168.1056 | 1.2356 |  |  |
|  | 3 | 247.2306 | 7.0000 | 1.4370 | 95.1004 |
|  | 4 | −199.8985 | 0.4000 |  |  |
|  | 5 | 63.2082 | 8.3000 | 1.4370 | 95.1004 |
|  | 6 | 185.5895 | 11.6178 |  |  |
|  | 7 | 63.8991 | 2.5000 | 1.7174 | 29.5005 |
|  | 8 | 45.8463 | 0.7500 |  |  |
|  | 9 | 48.7435 | 9.0000 | 1.5928 | 68.6244 |
|  | 10 | 205.2494 | d10 |  |  |
| G2 | 11 | −216.2455 | 1.5000 | 1.8042 | 46.5025 |
|  | 12 | 38.0084 | 5.7979 |  |  |
|  | 13 | −101.2705 | 1.5000 | 1.5928 | 68.6244 |
|  | 14 | 39.7503 | 5.3500 | 1.8081 | 22.7643 |
|  | 15 | −2054.9944 | 2.7303 |  |  |
|  | 16 | −56.9130 | 1.5000 | 1.8042 | 46.5025 |
|  | 17 | −183.2298 | d17 |  |  |

TABLE 1-continued

Example 1

| Lens Group | si | ri | di | ni | vi |
|---|---|---|---|---|---|
| G3 | 18 | 848.5024 | 2.8000 | 1.7433 | 49.2216 |
|  | 19 | −109.3368 | 0.2000 |  |  |
|  | 20 | 89.2729 | 7.1912 | 1.4970 | 81.6084 |
|  | 21 | −47.2999 | 1.8000 | 1.8061 | 33.2694 |
|  | 22 | −113.0282 | d22 |  |  |
|  | 23 STO | ∞ | 2.0000 |  |  |
| G4 | 24 ASP | 72.5977 | 4.7000 | 1.5831 | 59.4609 |
|  | 25 | 166.4337 | 0.4000 |  |  |
|  | 26 | 39.1350 | 5.0000 | 1.4970 | 81.6084 |
|  | 27 | 175.4979 | 0.3000 |  |  |
|  | 28 | 50.7172 | 1.5000 | 2.0010 | 29.1000 |
|  | 29 | 24.1826 | 8.5000 | 1.5673 | 42.8418 |
|  | 30 | −112.0366 | d30 |  |  |
| G5 | 31 ASP | −450.0000 | 1.3000 | 1.5831 | 59.4609 |
|  | 32 ASP | 25.8438 | d32 |  |  |
| G6 | 33 ASP | 38.0555 | 6.3000 | 1.5163 | 64.0651 |
|  | 34 | −67.3230 | 1.4000 | 1.8061 | 33.3450 |
|  | 35 | −296.9887 | 5.1373 |  |  |
|  | 36 | 157.7712 | 7.1138 | 1.6727 | 32.1705 |
|  | 37 | −27.3324 | 1.3000 | 1.8348 | 42.7218 |
|  | 38 | −41.3523 | 0.4000 |  |  |
|  | 39 | −73.0000 | 1.4000 | 1.7292 | 54.6735 |
|  | 40 | 213.5160 | 6.5499 |  |  |
|  | 41 | −27.3634 | 1.3000 | 1.8830 | 40.8054 |
|  | 42 | −64.4511 | (BF) |  |  |

TABLE 2

Example 1·Aspherical Coefficient

| | s24 | s31 | s32 | s33 |
|---|---|---|---|---|
| K | 0 | 0 | 0 | 0 |
| A4 | −2.11750E−06 | 1.06533E−06 | −6.11153E−06 | −6.31905E−07 |
| A6 | −2.28633E−10 | −4.12307E−09 | −7.64389E−09 | 2.79472E−09 |
| A8 | 1.66377E−12 | 2.76793E−11 | −6.19757E−11 | −6.29142E−12 |
| A10 | −1.62257E−15 | 7.79734E−14 | 9.35929E−14 | 0 |

TABLE 3

Example 1

| f | 72.1013 | 117.9861 | 193.9863 |
|---|---|---|---|
| FNo. | 2.8823 | 2.8804 | 2.8823 |
| ω | 17.1707 | 10.3029 | 6.1527 |
| Lens Total Length | 215.1482 | 215.1482 | 215.1482 |
| d10 | 2.6917 | 23.0471 | 33.5863 |
| d17 | 26.3670 | 18.3886 | 2.0000 |
| d22 | 15.2719 | 2.8950 | 8.7441 |
| d30 | 3.8848 | 2.8892 | 2.9631 |
| d32 | 7.7507 | 8.7463 | 8.6725 |

FIG. 4 illustrates, at the upper row, various aberrations at the wide end in Numerical Example 1. FIG. 4 illustrates, at the middle row, various aberrations at the intermediate position in Numerical Example 1. FIG. 4 illustrates, at the lower row, various aberrations at the telephoto end in Numerical Example 1. FIG. 4 illustrates, as the various aberrations, spherical aberration, astigmatism (field curvature), and distortion aberration. In an astigmatism diagram, a solid line (S) indicates values in a sagittal image plane, and a broken line (M) indicates values in a meridional image plane. Each of the aberration diagrams indicates values in e-line (wavelength 546.07 nm). The spherical aberration diagram also indicates values of C-line (wavelength 656.3 nm) and g-line wavelength 435.8 nm). The same holds true also for aberration diagrams in other numerical examples described hereinafter.

As appreciated from each of the aberration diagrams, in the zoom lens 1 according to Numerical Example 1, the aberrations are each favorably corrected in a well-balanced manner at the wide end, the intermediate position, and the telephoto end, and thus it is obvious that the zoom lens 1 according to Numerical Example 1 has a superior image-forming performance.

Numerical Example 2

Table 4 indicates basic lens data of Numerical Example 2 in which specific numerical values are applied to the zoom lens 2 illustrated in FIG. 2. Further, Table 5 indicates coefficient values in a spherical surfaces. Furthermore, Table 6 indicates values of a focal length f of an entire lens system, F number (FNo.), the half angle of view ω, and a lens total length at each of the wide end (the short focal length end), the intermediate position (the standard angle of view, the intermediate focal length), and the telephoto end (the long focal length end).

Moreover, Table 6 also indicates values of variable surface intervals. In Numerical Example 2, values of surface intervals d6, d10, d17, d22, d30, and d32 vary upon zooming.

In the zoom lens 2 according to Numerical Example 2, the rear side first lens group G1R and the fifth lens group G5 each serve as a focusing lens group. The rear side first lens group G1R travels toward the object side along the optical axis upon focusing from the infinite object to the short-distance object. The fifth lens group G5 travels toward the image plane side along the optical axis upon focusing from the infinite object to the short-distance object.

In the zoom lens 2 according to Numerical Example 2, the front side first lens group G1F includes, in order from the object side, the negative meniscus lens L1F1, the positive lens L1F2, and the positive meniscus lens L1F3. The positive lens L1F2 and the positive meniscus lens L1F3 each include a material with an Abbe number of 95.1, and each have a configuration in which chromatic aberration is favorably corrected at the telephoto end in particular.

In Numerical Example 2, the rear side first lens group G1R travels along the optical axis direction upon zooming. Moving the rear side first lens group G1R along the optical axis at the time of zooming makes it possible to shorten the total length of the zoom lens.

The rear side first lens group G1R includes, in order from the object side, the negative meniscus lens L1R1 and the positive meniscus lens L1R2. Allowing the rear side first lens group G1R, to have a configuration of Numerical Example 2 makes it possible to suppress variation in chromatic aberration at the time of focusing.

The second lens group G2 includes, in order from the object side, the negative lens L21, the cemented lens in which the negative lens L22 and the positive lens L23 are joined, and the negative meniscus lens L24. Allowing the second lens group G2 to have the configuration of Numerical Example 2 makes it possible to suppress variation in aberration mainly at the time of zooming.

The third lens group G3 includes, in order from the object side, the positive lens L31, and the cemented lens in which the positive lens L32 and the negative lens L33 are joined. Allowing the third lens group G3 to have the configuration of Numerical Example 2 makes it possible to suppress variation in aberration mainly at the time of zooming.

The fourth lens group G4 having positive refractive power, the fifth lens group G5 having negative refractive power, and the sixth lens group G6 having positive refractive power configure the principal image-forming system of the zoom lens. Moving the fifth lens group G5 at the time of zooming makes it possible to shorten the total length of the zoom lens.

The fourth lens group G4 includes, in order from the object side, the positive lens L41, the positive lens L42 having an aspherical surface formed on a surface on the object side, and the cemented lens in which the negative lens L43 and the positive lens L44 are joined. Allowing the fourth lens group G4 to have the configuration of Numerical Example 2 makes it possible to correct spherical aberration, coma aberration, and field curvature that occur at the fourth lens group G4, the fifth lens group G5, and the sixth lens group G6 that configure the principal image-forming system.

The fifth lens group G5 includes, in order from the object side, the negative lens L51 having an aspherical surface formed on both surfaces thereof. Allowing the fifth lens group G5 to have the configuration of Numerical Example 2 makes it possible to achieve a focusing lens group having a reduced weight.

The sixth lens group G6 includes, in order from the object side, the cemented lens in which the positive lens L61 having an aspherical surface formed on the surface on the object side and the negative lens L62 are joined, the positive lens L63, the cemented lens in which the negative lens L64 and the positive lens L65 are joined, and the negative lens L66. Allowing the sixth lens group G6 to have the configuration of Numerical Example 2 makes it possible to cause an exit pupil position to come close to the image side, allowing for an advantageous configuration in avoiding interference between a mount diameter and a ray in the case of using an interchangeable-lens camera.

It is possible for the cemented lens including the positive lens L61 and the negative lens L62 to correct image shake by traveling in a direction perpendicular to the optical axis Z1, as the vibration-proof lens group.

TABLE 4

Example 2

| Lens Group | si | ri | di | ni | vi |
|---|---|---|---|---|---|
| G1 | 1 | 472.3226 | 3.0000 | 1.6584 | 50.8546 |
| | 2 | 141.7936 | 1.5000 | | |
| | 3 | 190.9826 | 8.0000 | 1.4370 | 95.1004 |
| | 4 | −240.2622 | 0.4000 | | |
| | 5 | 63.6910 | 8.5000 | 1.4370 | 95.1004 |
| | 6 | 195.8736 | d6 | | |
| | 7 | 61.6913 | 2.6000 | 1.7408 | 27.7605 |
| | 8 | 43.8132 | 0.7000 | | |
| | 9 | 45.7874 | 9.0000 | 1.5935 | 67.0018 |
| | 10 | 173.3940 | d10 | | |
| G2 | 11 | −358.4322 | 1.5000 | 1.8042 | 46.5025 |
| | 12 | 37.5458 | 6.2163 | | |
| | 13 | −129.5938 | 1.5000 | 1.7292 | 54.6735 |
| | 14 | 33.8694 | 7.8792 | 1.8467 | 23.7848 |
| | 15 | −158.0603 | 3.1441 | | |
| | 16 | −54.4633 | 1.5000 | 1.9037 | 31.3150 |
| | 17 | −206.0295 | d17 | | |
| G3 | 18 | 175.3369 | 2.8000 | 1.8348 | 42.7218 |
| | 19 | −227.8575 | 0.2000 | | |
| | 20 | 112.5478 | 7.4312 | 1.4970 | 81.6084 |
| | 21 | −40.6534 | 1.8000 | 1.8061 | 33.2694 |
| | 22 | −112.0471 | d22 | | |
| | 23 STO | ∞ | 2.0000 | | |
| G4 | 24 | 41.5211 | 4.5000 | 1.4970 | 81.6084 |
| | 25 | 194.6215 | 0.2000 | | |
| | 26 ASP | 65.3312 | 4.5000 | 1.6935 | 53.2008 |
| | 27 | −271.1528 | 0.2000 | | |
| | 28 | 115.4542 | 1.5000 | 1.9108 | 35.2500 |
| | 29 | 24.1479 | 8.0000 | 1.5481 | 45.8207 |
| | 30 | −161.4412 | d30 | | |
| G5 | 31 ASP | 261.4705 | 1.2000 | 1.5920 | 67.0227 |
| | 32 ASP | 24.8412 | d32 | | |
| G6 | 33 ASP | 34.9196 | 6.0000 | 1.5935 | 67.0018 |
| | 34 | 907.0752 | 1.3000 | 1.8052 | 25.4564 |
| | 35 | 187.3866 | 3.2933 | | |
| | 36 | 38.4955 | 3.0000 | 1.6385 | 55.4496 |
| | 37 | 58.9708 | 3.1071 | | |
| | 38 | −128.0509 | 1.6000 | 1.7292 | 54.6735 |
| | 39 | 23.6324 | 10.0000 | 1.6200 | 36.3006 |
| | 40 | −60.7297 | 1.0237 | | |
| | 41 | −41.9722 | 1.3000 | 1.8348 | 42.7218 |
| | 42 | 922.4511 | (BF) | | |

TABLE 5

Example 2•Aspherical Coefficient

| | s26 | s31 | s32 | s33 |
|---|---|---|---|---|
| K | 0 | 0 | 0 | 0 |
| A4 | −2.82016E−06 | 1.31109E−06 | −5.89265E−06 | −8.03408E−07 |
| A6 | 3.29888E−10 | −1.21377E−08 | −1.37586E−08 | 5.54118E−09 |
| A8 | 0 | 1.60767E−11 | −3.25364E−11 | −1.98714E−11 |
| A10 | 0 | 0 | 5.67610E−14 | 2.94441E−14 |

TABLE 6

Example 2

| f | 72.0993 | 117.4982 | 193.9939 |
|---|---|---|---|
| FNo. | 2.8843 | 2.8234 | 2.8410 |
| ω | 17.0341 | 10.3474 | 6.1544 |
| Lens Total Length | 215.1482 | 215.1482 | 215.1482 |

TABLE 6-continued

Example 2

| | | | |
|---|---|---|---|
| d6 | 11.4673 | 13.5172 | 16.6344 |
| d10 | 2.0000 | 20.4322 | 30.6287 |
| d17 | 27.3210 | 19.1976 | 2.0000 |
| d22 | 15.6014 | 3.2427 | 7.1266 |
| d30 | 7.5889 | 5.4002 | 2.5000 |
| d32 | 4.6665 | 6.8552 | 9.7555 |

FIG. 5 illustrates, at the upper row, various aberrations at the wide end in Numerical Example 2. FIG. 5 illustrates, at the middle row, various aberrations at the intermediate position in Numerical Example 2. FIG. 5 illustrates, at the lower row, various aberrations at the telephoto end in Numerical Example 2.

As appreciated from each of the aberration diagrams, in the zoom lens 2 according to Numerical Example 2, the aberrations are each favorably corrected in a well-balanced manner at the wide end, the intermediate position, and the telephoto end, and thus it is obvious that the zoom lens 2 according to Numerical Example 2 has a superior image-forming performance.

Numerical Example 3

Table 7 indicates basic lens data of Numerical Example 3 in which specific numerical values are applied to the zoom lens 3 illustrated in FIG. 3. Further, Table 8 indicates coefficient values in aspherical surfaces. Furthermore, Table 9 indicates values of a focal length f of an entire lens system, F number (FNo.), the half angle of view w, and a lens total length at each of the wide end (the short focal length end), the intermediate position (the standard angle of view, the intermediate focal length), and the telephoto end (the long focal length end).

Moreover, Table 9 also indicates values of variable surface intervals. In Numerical Example 3, values of surface intervals d10, d15, d17, d22, d30, and d32 vary upon zooming.

In the zoom lens 3 according to Numerical Example 3, the negative lens, of the second lens group G2, positioned closest to the image plane side, in addition to the rear side first lens group G1R and the fifth lens group G5, serves as a focusing lens group. The rear side first lens group G1R travels toward the object side along the optical axis upon focusing from the infinite object to the short-distance object. The fifth lens group G5 travels toward the image plane side along the optical axis upon focusing from the infinite object to the short-distance object. The negative lens, of the second lens group G2, positioned closest to the image plane side travels toward the object side along the optical axis upon focusing from the infinite object to the short-distance object.

In the zoom lens 3 according to Numerical Example 3, the front side first lens group G1F includes, in order from the object side, the negative meniscus lens L1F1, the positive lens L1F2, and the positive meniscus lens L1F3. The positive lens L1F2 and the positive meniscus lens L1F3 each include a material with an Abbe number of 95.1, and each have a configuration in which chromatic aberration is favorably corrected at the telephoto end in particular.

The rear side first lens group G1R is fixed with respect to the image plane in the optical axis direction upon zooming. The rear side first lens group G1R includes, in order from the object side, the negative meniscus lens L1R1 and the positive meniscus lens L1R2. Allowing the rear side first lens group G1R to have a configuration of Numerical Example 3 makes it possible to suppress variation in chromatic aberration at the time of focusing.

The second lens group G2 includes, in order from the object side, the negative lens L21, the cemented lens in which the negative lens L22 and the positive lens L23 are joined, and the negative meniscus lens L24.

In Numerical Example 3, the negative lens L21 and the cemented lens in which the negative lens L22 and the positive lens L23 are joined configure a second F lens group (a front side second lens group) G2F. Further, the negative meniscus lens L24 that is the negative lens, of the second lens group G2, positioned closest to the image plane side configures a second R lens group (a rear side second lens group) G2R. Moreover, upon zooming, the second F lens group G2F and the second R lens group G2R travel along the optical axis in loci different from each other.

In Numerical Example 3, moving the second R lens group G2R in the optical axis direction upon focusing makes it possible not only to suppress variation in aberration at the time of focusing, but also to effectively suppress breathing due to the focusing.

The third lens group G3 includes, in order from the object side, the positive lens L31, and the cemented lens in which the positive lens L32 and the negative lens L33 are joined. Allowing the third lens group G3 to have the configuration of Numerical Example 3 makes it possible to suppress variation in aberration mainly at the time of zooming.

The fourth lens group G4 having positive refractive power, the fifth lens group G5 having negative refractive power, and the sixth lens group G6 having positive refractive power configure the principal image-forming system of the zoom lens. Moving the fifth lens group G5 at the time of zooming makes it possible to shorten the total length of the zoom lens.

The fourth lens group G4 includes, in order from the object side, the positive lens L41 having an aspherical surface formed on a surface on the object side, the positive lens L42, and the cemented lens in which the negative lens L43 and the positive lens L44 are joined. Allowing the fourth lens group G4 to have the configuration of Numerical Example 3 makes it possible to correct spherical aberration, coma aberration, and field curvature that occur at the fourth lens group G4, the fifth lens group G5, and the sixth lens group G6 that configure the principal image-forming system.

The fifth lens group G5 includes, in order from the object side, the negative lens L51 having an aspherical surface formed on both surfaces thereof. Allowing the fifth lens group G5 to have the configuration of Numerical Example 3 makes it possible to achieve a focusing lens group having a reduced weight.

The sixth lens group G6 includes, in order from the object side, the cemented lens in which the positive lens L61 and the negative lens L62 are joined, the positive lens L63 having an aspherical surface formed on a surface on the object side, the cemented lens in which the negative lens L64 and the positive lens L65 are joined, and the negative lens L66. Allowing the sixth lens group G6 to have the configuration of Numerical Example 3 makes it possible to cause an exit pupil position to come close to the image side, allowing for an advantageous configuration in avoiding interference between a mount diameter and a ray in the case of using an interchangeable-lens camera.

It is possible for the cemented lens including the positive lens L61 and the negative lens L62 to correct image shake by traveling, as the vibration-proof lens group, in a direction perpendicular to the optical axis Z1.

TABLE 7

Example 3

| Lens Group | si | ri | di | ni | vi |
|---|---|---|---|---|---|
| G1 | 1 | 287.3026 | 3.0000 | 1.8042 | 46.5025 |
|  | 2 | 128.7854 | 0.8000 |  |  |
|  | 3 | 144.7032 | 9.0000 | 1.4370 | 95.1004 |
|  | 4 | −252.9498 | 0.4000 |  |  |
|  | 5 | 67.8427 | 8.5000 | 1.4370 | 95.1004 |
|  | 6 | 246.8166 | 6.2239 |  |  |
|  | 7 | 60.5053 | 2.6000 | 1.7174 | 29.5005 |
|  | 8 | 50.6971 | 0.7000 |  |  |
|  | 9 | 52.9883 | 8.1000 | 1.5928 | 68.6244 |
|  | 10 | 195.8327 | d10 |  |  |
| G2 | 11 | 390.8033 | 1.5000 | 1.8042 | 46.5025 |
|  | 12 | 34.0748 | 8.9289 |  |  |
|  | 13 | −66.9766 | 1.5000 | 1.5928 | 68.6244 |
|  | 14 | 40.8284 | 6.8724 | 1.8081 | 22.7643 |
|  | 15 | −217.5319 | d15 |  |  |
|  | 16 | −50.4560 | 1.5000 | 1.8042 | 46.5025 |
|  | 17 | 398.9345 | d17 |  |  |
| G3 | 18 | −3561.6129 | 3.0000 | 1.7433 | 49.2216 |
|  | 19 | −92.5222 | 0.2000 |  |  |
|  | 20 | 77.2067 | 7.4877 | 1.4970 | 81.6084 |
|  | 21 | −45.9070 | 1.8000 | 1.8061 | 33.2694 |
|  | 22 | −222.7032 | d22 |  |  |
|  | 23 STO | ∞ | 2.0000 |  |  |
| G4 | 24 ASP | 44.0000 | 5.0000 | 1.5831 | 59.4609 |
|  | 25 | 426.4499 | 0.3000 |  |  |
|  | 26 | 59.5412 | 4.5000 | 1.4970 | 81.6084 |
|  | 27 | −225.0533 | 0.2000 |  |  |
|  | 28 | 57.7053 | 1.5000 | 2.0010 | 29.1000 |
|  | 29 | 21.9472 | 8.0000 | 1.5673 | 42.8418 |
|  | 30 | 167.4792 | d30 |  |  |
| G5 | 31 ASP | 68.0151 | 1.2000 | 1.5831 | 59.4609 |
|  | 32 ASP | 22.2864 | d32 |  |  |
| G6 | 33 | 37.6497 | 6.0000 | 1.5163 | 64.0651 |
|  | 34 | −142.4361 | 1.3000 | 1.8061 | 33.3450 |
|  | 35 | 361.4435 | 6.3687 |  |  |
|  | 36 ASP | 123.8811 | 3.5000 | 1.6727 | 32.1705 |
|  | 37 | −116.4555 | 0.7375 | 1.8348 | 42.7218 |
|  | 38 | −112.0184 | 1.6000 |  |  |
|  | 39 | 24.2405 | 8.5000 | 1.7292 | 54.6735 |
|  | 40 | −152.9991 | 2.9105 |  |  |
|  | 41 | −31.4953 | 1.3000 | 1.8830 | 40.8054 |
|  | 42 | −104.9240 | (BF) |  |  |

TABLE 8

Example 3·Aspherical Coefficient

|  | s24 | s31 | s32 | s36 |
|---|---|---|---|---|
| K | 0 | 0 | 0 | 0 |
| A4 | −3.11354E−06 | 1.04316E−06 | −6.00084E−06 | 3.42168E−06 |
| A6 | 1.93986E−10 | −1.98697E−08 | −3.20076E−08 | 7.62895E−09 |
| A8 | 0 | 3.00535E−11 | −1.24399E−11 | −2.75182E−11 |
| A10 | 0 | 0 | 1.33986E−14 | 4.52840E−14 |

TABLE 9

Example 3

| f | 72.0999 | 117.5122 | 193.9984 |
|---|---|---|---|
| FNo. | 2.8840 | 2.8382 | 2.9157 |
| ω | 16.7255 | 10.2364 | 6.1623 |
| Lens Total Length | 215.1482 | 215.1482 | 215.1482 |
| d10 | 2.0000 | 19.7209 | 30.3078 |
| d15 | 6.2996 | 7.8916 | 12.3323 |
| d17 | 23.8344 | 16.4982 | 2.0000 |
| d22 | 16.7770 | 4.8002 | 4.2717 |
| d30 | 7.2333 | 5.1570 | 2.5000 |
| d32 | 4.3660 | 6.4424 | 9.0994 |

FIG. 6 illustrates, at the upper row, various aberrations at the wide end in Numerical Example 3. FIG. 6 illustrates, at the middle row, various aberrations at the intermediate position in Numerical Example 3. FIG. 6 illustrates, at the lower row, various aberrations at the telephoto end in Numerical Example 3.

As appreciated from each of the aberration diagrams, in the zoom lens 3 according to Numerical Example 3, the aberrations are each favorably corrected in a well-balanced manner at the wide end, the intermediate position, and the telephoto end, and thus it is obvious that the zoom lens 3 according to Numerical Example 3 has a superior image-forming performance.

Other Numerical Data of Each Numerical Example

Table 10 indicates consolidated values of the above-described conditional expressions for each of the numerical examples. As appreciated from Table 10, the values of each of the numerical examples are within the numerical range for each of the conditional expressions.

TABLE 10

| Conditional Expression |  | Example 1 | Example 2 | Example 3 |
|---|---|---|---|---|
| (1) | F1R/F1 | 0.510 | 0.485 | 0.449 |
| (2) | OL4/F456T | 0.706 | 0.600 | 0.900 |
| (3) | $(1 - \beta t5^2)*\beta t6^2$ | −4.499 | −3.385 | −2.658 |
| (4) | Hft/Ft | −0.855 | −1.034 | −0.860 |
| (5) | vd1F | 95.100 | 95.100 | 95.100 |
| (6) | nd5 | 1.583 | 1.592 | 1.583 |

5. Other Embodiments

The technique according to the disclosure is not limited to descriptions of the foregoing embodiments and examples, and may be modified in a variety of ways.

For example, shapes and numerical values of respective components illustrated in each of the above-described numerical examples are merely illustrative for specifying and carrying out the technology, and should not be used to interpret the technical scope of the technology in a limitative manner.

Further, although description has been given, in the above-described embodiments and examples, of the configuration substantially including six lens groups, a configuration further including a lens not substantially having refractive power may be adopted.

Further, for example, the technology may have the following configurations.

[1]

A zoom lens including: in order from object side toward image plane side, a first lens group having positive refractive power; a second lens group; a third lens group; a fourth lens group; a fifth lens group; and a sixth lens group, the first lens group including, in order from the object side toward the image plane side, a front side first lens group fixed with respect to an image plane upon zooming from a wide end to a telephoto end and focusing from an infinite object to a short-distance object, and a rear side first lens group having positive refractive power, the second lens group, the third lens group, and the fifth lens group traveling along an optical axis upon the zooming, the fourth lens group and the sixth lens group being fixed with respect to the image plane in an optical axis direction upon the zooming, and at least two lens groups including the rear side first lens group traveling along the optical axis upon the focusing.

[2]

The zoom lens according to [1], in which the rear side first lens group is fixed with respect to the image plane in the optical axis direction upon the zooming.

[3]

The zoom lens according to [1] or [2], in which the following conditional expression is satisfied:

$$0.4<F1R/F1<0.56 \quad (1)$$

provided that

F1 denotes a focal length of the first lens group, and

F1R denotes a focal length of the rear side first lens group.

[4]

The zoom lens according to any one of [1] to [3], in which the following conditional expression is satisfied:

provided that

OL4 denotes a distance on the optical axis from an apex of a lens surface, of the fourth lens group, positioned closest to the object side to the image plane, and F456T denotes a composite focal length of the fourth lens group, the fifth lens group, and the sixth lens group at telephoto ends.

[5]

The zoom lens according to any one of [1] to [4,] in which further the fifth lens group, in addition to the rear side first lens group, travels along the optical axis upon the focusing.

[6]

The zoom lens according to [5], in which the following conditional expression is satisfied:

$$-5.5<(1-\beta t5^2)*\beta t6^2)<-2 \quad (3)$$

provided that

βt5 denotes a lateral magnification of the fifth lens group at a telephoto end at a time of infinite focusing, and βt6 denotes a lateral magnification of the sixth lens group at a telephoto end at the time of infinite focusing.

[7]

The zoom lens according to [5] or [6], in which the second lens group includes a negative lens positioned closest to the image plane side, and further the negative lens, of the second lens group, positioned closest to the image plane side, in addition to the rear side first lens group and the fifth lens group, travels along the optical axis upon the focusing.

[8]

The zoom lens according to any one of [1] to [7], in which the following conditional expression is satisfied:

$$-1.2<Hft/Ft<-0.5 \quad (4)$$

provided that

Hft denotes a distance from a lens surface positioned closest to the object side to a position of a front side principal point at a time of focusing on infinite at the telephoto end, and Ft denotes a focal length of an entire lens system at the telephoto end.

[9]

The zoom lens according to any one of [1] to [8], in which the front side first lens group includes two positive lenses.

[10]

The zoom lens according to [9], in which the following conditional expression is satisfied:

$$80<vd1F<110 \quad (5)$$

provided that vd1F denotes a maximum value of Abbe number of each of the two positive lenses of the front side first lens group.

[11]

The zoom lens according to any one of [1] to [10], in which the fourth lens group includes, from the object side toward the image plane side, two positive lenses and a cemented lens including a negative lens and a positive lens.

[12]

The zoom lens according to any one of [1] to [11], in which the fifth lens group includes one negative lens.

[13]

The zoom lens according to [12], in which the following condition is satisfied:

$$1.45<nd5<1.65 \quad (6)$$

provided that nd5 denotes a refractive index of the negative lens that configures the fifth lens group.

[14]

The zoom lens according to any one of [1] and [3] to [13], in which the rear side first lens group travels along the optical axis upon the zooming.

[15]

The zoom lens according to any one of [1] to [14], further including a lens not substantially having refractive power.

[16]

An optical instrument including: a zoom lens; and an imaging device that outputs an imaging signal corresponding to an optical image formed by the zoom lens, the zoom lens including, in order from object side toward image plane side, a first lens group having positive refractive power, a second lens group, a third lens group, a fourth lens group, a fifth lens group, and a sixth lens group, the first lens group including, in order from the object side toward the image plane side, a front side first lens group fixed with respect to an image plane upon zooming from a wide end to a telephoto end and focusing from an infinite object to a short-distance object, and a rear side first lens group having positive refractive power, the second lens group, the third lens group, and the fifth lens group traveling along an optical axis upon the zooming, the fourth lens group and the sixth lens group being fixed with respect to the image plane in an optical axis direction upon the zooming, and at least two lens groups including the rear side first lens group traveling along the optical axis upon the focusing.

[17]

The optical instrument according to [16], further including a lens not substantially having refractive power.

This application claims the benefit of Japanese Priority Patent Application JP2016-016980 filed with the Japan Patent Office on Feb. 1, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A zoom lens comprising: in order from object side toward image plane side, a first lens group having positive refractive power; a second lens group; a third lens group; a fourth lens group; a fifth lens group; and a sixth lens group,
the first lens group including, in order from the object side toward the image plane side, a front side first lens group fixed with respect to an image plane upon zooming from a wide end to a telephoto end and focusing from an infinite object to a short-distance object, and a rear side first lens group having positive refractive power,
the second lens group, the third lens group, and the fifth lens group traveling along an optical axis upon the zooming,
the fourth lens group and the sixth lens group being fixed with respect to the image plane in an optical axis direction upon the zooming, and
at least two lens groups including the rear side first lens group traveling along the optical axis upon the focusing.

2. The zoom lens according to claim 1, wherein the rear side first lens group is fixed with respect to the image plane in the optical axis direction upon the zooming.

3. The zoom lens according to claim 1, wherein the following conditional expression is satisfied:

$$0.4 < F1R/F1 < 0.56 \quad (1)$$

provided that
F1 denotes a focal length of the first lens group, and
F1R denotes a focal length of the rear side first lens group.

4. The zoom lens according to claim 1, wherein the following conditional expression is satisfied:

$$0.5 < OL4/F456T < 1.0 \quad (2)$$

provided that
OL4 denotes a distance on the optical axis from an apex of a lens surface, of the fourth lens group, positioned closest to the object side to the image plane, and
F456T denotes a composite focal length of the fourth lens group, the fifth lens group, and the sixth lens group at telephoto ends.

5. The zoom lens according to claim 1, wherein further the fifth lens group, in addition to the rear side first lens group, travels along the optical axis upon the focusing.

6. The zoom lens according to claim 5, wherein the following conditional expression is satisfied:

$$-5.5 < (1-\beta t5^2)*\beta t6^2) < -2 \quad (3)$$

provided that
βt5 denotes a lateral magnification of the fifth lens group at a telephoto end at a time of infinite focusing, and
βt6 denotes a lateral magnification of the sixth lens group at a telephoto end at the time of infinite focusing.

7. The zoom lens according to claim 5, wherein
the second lens group includes a negative lens positioned closest to the image plane side, and
further the negative lens, of the second lens group, positioned closest to the image plane side, in addition to the rear side first lens group and the fifth lens group, travels along the optical axis upon the focusing.

8. The zoom lens according to claim 1, wherein the following conditional expression is satisfied:

$$-1.2 < Hft/Ft < -0.5 \quad (4)$$

provided that
Hft denotes a distance from a lens surface positioned closest to the object side to a position of a front side principal point at a time of focusing on infinite at the telephoto end, and
Ft denotes a focal length of an entire lens system at the telephoto end.

9. The zoom lens according to claim 1, wherein the front side first lens group includes two positive lenses.

10. The zoom lens according to claim 9, wherein the following conditional expression is satisfied:

$$80 < vd1F < 110 \quad (5)$$

provided that
vd1F denotes a maximum value of Abbe number of each of the two positive lenses of the front side first lens group.

11. The zoom lens according to claim 1, wherein the fourth lens group includes, from the object side toward the image plane side, two positive lenses and a cemented lens including a negative lens and a positive lens.

12. The zoom lens according to claim 1, wherein the fifth lens group includes one negative lens.

13. The zoom lens according to claim 12, wherein the following condition is satisfied:

$$1.45 < nd5 < 1.65 \quad (6)$$

provided that
nd5 denotes a refractive index of the negative lens that configures the fifth lens group.

14. The zoom lens according to claim 1, wherein the rear side first lens group travels along the optical axis upon the zooming.

15. An optical instrument comprising:
a zoom lens; and
an imaging device that outputs an imaging signal corresponding to an optical image formed by the zoom lens,
the zoom lens including, in order from object side toward image plane side, a first lens group having positive refractive power, a second lens group, a third lens group, a fourth lens group, a fifth lens group, and a sixth lens group,
the first lens group including, in order from the object side toward the image plane side, a front side first lens group fixed with respect to an image plane upon zooming from a wide end to a telephoto end and focusing from an infinite object to a short-distance object, and a rear side first lens group having positive refractive power,
the second lens group, the third lens group, and the fifth lens group traveling along an optical axis upon the zooming,
the fourth lens group and the sixth lens group being fixed with respect to the image plane in an optical axis direction upon the zooming, and
at least two lens groups including the rear side first lens group traveling along the optical axis upon the focusing.

16. The optical instrument according to claim 15, wherein the following conditional expression is satisfied:

$$0.4 < F1R/F1 < 0.56 \quad (1)$$

provided that
F1 denotes a focal length of the first lens group, and
F1R denotes a focal length of the rear side first lens group.

17. The optical instrument according to claim 15, wherein the following conditional expression is satisfied:

$$0.5 < OL4/F456T < 1.0 \qquad (2)$$

provided that
OL4 denotes a distance on the optical axis from an apex of a lens surface, of the fourth lens group, positioned closest to the object side to the image plane, and
F456T denotes a composite focal length of the fourth lens group, the fifth lens group, and the sixth lens group at telephoto ends.

18. The optical instrument according to claim 15, wherein further the fifth lens group, in addition to the rear side first lens group, travels along the optical axis upon the focusing, and wherein the following conditional expression is satisfied:

$$-5.5 < (1-\beta t5^2)*\beta t6^2 < -2 \qquad (3)$$

provided that
βt5 denotes a lateral magnification of the fifth lens group at a telephoto end at a time of infinite focusing, and
βt6 denotes a lateral magnification of the sixth lens group at a telephoto end at the time of infinite focusing.

19. The optical instrument according to claim 15, wherein the following conditional expression is satisfied:

$$-1.2 < Hft/Ft < -0.5 \qquad (4)$$

provided that
Hft denotes a distance from a lens surface positioned closest to the object side to a position of a front side principal point at a time of focusing on infinite at the telephoto end, and
Ft denotes a focal length of an entire lens system at the telephoto end.

20. The optical instrument according to claim 15, wherein the fourth lens group includes, from the object side toward the image plane side, two positive lenses and a cemented lens including a negative lens and a positive lens.

21. A zoom lens comprising: in order from object side toward image plane side, a first lens group having positive refractive power; a second lens group having negative refractive power; a third lens group having positive refractive power; a fourth lens group having positive refractive power; a fifth lens group having negative refractive power; and a sixth lens group having positive refractive power,
the first lens group including, in order from the object side toward the image plane side, a front side first lens group fixed with respect to an image plane upon zooming from a wide end to a telephoto end and focusing from an infinite object to a short-distance object, and a rear side first lens group having positive refractive power,
the second lens group, the third lens group, and the fifth lens group traveling along an optical axis upon the zooming,
the fourth lens group and the sixth lens group being fixed with respect to the image plane in an optical axis direction upon the zooming, and
at least two lens groups including the rear side first lens group traveling along the optical axis upon the focusing,
wherein the following conditional expression is satisfied:

$$0.4 < F1R/F1 < 0.56 \qquad (1)$$

provided that
F1 denotes a focal length of the first lens group, and
F1R denotes a focal length of the rear side first lens group.

* * * * *